United States Patent
Chai

(10) Patent No.: US 11,330,114 B2
(45) Date of Patent: May 10, 2022

(54) QUOTA MANAGEMENT METHOD AND APPARATUS

(71) Applicant: Huawei Technologies Co., Ltd., Shenzhen (CN)

(72) Inventor: Xiaoqian Chai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 197 days.

(21) Appl. No.: 16/453,733

(22) Filed: Jun. 26, 2019

(65) Prior Publication Data

US 2019/0320073 A1 Oct. 17, 2019

Related U.S. Application Data

(63) Continuation of application No. PCT/CN2017/104544, filed on Sep. 29, 2017.

(30) Foreign Application Priority Data

Dec. 28, 2016 (CN) .......................... 201611238536.2

(51) Int. Cl.
*H04W 4/24* (2018.01)
*H04M 15/00* (2006.01)

(52) U.S. Cl.
CPC ......... *H04M 15/854* (2013.01); *H04M 15/60* (2013.01); *H04M 15/61* (2013.01);
(Continued)

(58) Field of Classification Search
CPC ........ H04W 4/24; H04M 15/60; H04M 15/61
See application file for complete search history.

(56) References Cited

U.S. PATENT DOCUMENTS 9,654,650 B1 * 5/2017 Velusamy ........... H04L 12/1485
2010/0233995 A1 * 9/2010 Gopalaswamy ........ H04W 4/24
455/410

(Continued)

FOREIGN PATENT DOCUMENTS

CN 102244581 A 11/2011
CN 102308604 A 1/2012
(Continued)

OTHER PUBLICATIONS

XP011187092 Ralph Kühne et al., "Charging in the IP Multimedia Subsystem: A Tutorial", IP Multimedia Subsystem, IEEE Communications Magazine, Jul. 2007, 8 pages.
XP011420412 Ralph Kühne et al.,"Charging and Billing in Modern Communications Networks—A Comprehensive Survey of the State of the Art and Future Requirements", IEEE Communications Surveys and Tutorials, vol. 14, No. 1, First Quarter 2012, 23 pages.
(Continued)

*Primary Examiner* — Sam Bhattacharya
(74) *Attorney, Agent, or Firm* — Slater Matsil, LLP

(57) ABSTRACT

A quota management method includes: sending, by a client, a charging request to a server, where the charging request carries quota request information and information of quota usage; receiving, by the client, a granted quota and indication information from the server; processing, by the client, the granted quota and a remaining quota on the client based on the indication information, where the remaining quota is a difference between a quota granted by the server last time and the quota usage in the charging request; and using, by the client, a processed quota, and reporting information of usage of the processed quota when a reporting condition is met.

21 Claims, 5 Drawing Sheets

(52) U.S. Cl.
CPC ..... *H04M 15/8235* (2013.01); *H04M 15/887* (2013.01); *H04W 4/24* (2013.01)

(56) References Cited

U.S. PATENT DOCUMENTS

| | | | | |
|---|---|---|---|---|
| 2015/0341503 | A1* | 11/2015 | Chandramouli | H04M 15/58 455/405 |
| 2016/0373590 | A1* | 12/2016 | Oltmanns | H04W 4/24 |
| 2017/0134178 | A1 | 5/2017 | Yang | |

FOREIGN PATENT DOCUMENTS

| CN | 105515793 A | 4/2016 |
|---|---|---|
| EP | 2713550 | 4/2014 |
| WO | 2006136891 A1 | 12/2006 |
| WO | 2011157123 A2 | 12/2011 |
| WO | 2013100829 A1 | 7/2013 |
| WO | 2016078392 A1 | 5/2015 |

OTHER PUBLICATIONS

XP031706388 Joyce B. Mwangama et al.,"Charging and Billing for Composite Services in a Multi-Service Provider Environment: The IMS Case", IEEE Communications Society subject matter experts for publication in the WCNC 2010 proceedings, 6 pages.

3GPP TS 32.299 V14.2.0 (Dec. 2016), 3rd Generation Partnership Project;Technical Specification Group Services and System Aspects; Telecommunication management; Charging management; Diameter charging applications (Release 14), Dec. 20, 2016, 194 pages.

H. Hakala et al., RFC4006, "Diameter Credit-Control Application", Network Working Group,dated Aug. 2005, 114 pages.

* cited by examiner

QUOTA MANAGEMENT METHOD AND APPARATUS

CROSS-REFERENCE TO RELATED APPLICATIONS

This application is a continuation of International Application No. PCT/CN2017/104544, filed on Sep. 29, 2017, which claims priority to Chinese Patent Application No. 201611238536.2, filed on Dec. 28, 2016. The disclosures of the aforementioned applications are hereby incorporated by reference in their entireties.

TECHNICAL FIELD

This application relates to the communications field, and in particular, to a quota management method and an apparatus.

BACKGROUND

In the 3rd Generation Partnership Project (3GPP), a credit-control client applies to a credit-control server for a quota for use. When a trigger event occurs, the credit-control client reports quota usage information to the credit-control server, and requests the credit-control server to deliver a new quota. The credit-control server reclaims a remaining quota on the credit-control client, and redelivers a new quota. In this case, if the credit-control client bypasses a service, a loss is caused to an operator. If the credit-control client suspends a service, a service delay is caused, and user experience is degraded.

SUMMARY

Embodiments of this application provide a quota management method and an apparatus, to shorten a service delay, and ensure that a quota used for a service does not exceed a granted quota.

According to a first aspect, a quota management method is provided, including: sending, by a client, a charging request to a server, where the charging request carries quota request information and information of quota usage; receiving, by the client, a granted quota and indication information from the server; processing the granted quota and a remaining quota on the client based on the indication information, where the remaining quota is a difference between a quota granted by the server last time and the quota usage in the charging request; and using, by the client, a processed quota, and reporting, by the client, information of usage of the processed quota when a reporting condition is met.

With reference to implementations of the first aspect, in a first possible implementation of the first aspect, processing, by the client, the granted quota and the remaining quota on the client based on the indication information, and reporting the information of usage of the processed quota when the reporting condition is met include: combining, by the client, the granted quota and the remaining quota, and reporting, by the client when reporting charging information, information of usage of a combined quota.

With reference to the first aspect or the first possible implementation of the first aspect, in a second possible implementation, the indication information includes a quota conversion coefficient, and combining, by the client, the granted quota and the remaining quota on the client includes: converting, by the client based on the quota conversion coefficient, an available remaining quota when the client receives the indication information, and combining the granted quota and the converted available remaining quota; and further reporting, by the client when reporting the charging information, information of usage of the remaining quota that is obtained when the indication information is received.

With reference to any one of the first aspect or the first and the second possible implementations of the first aspect, in a third possible implementation, processing, by the client, the granted quota and the remaining quota on the client based on the indication information, and reporting the information of the usage of the processed quota when the reporting condition is met includes: using, by the client based on the indication information, the granted quota after using up the remaining quota, and reporting, by the client, information of usage of the remaining quota and information of usage of the granted quota when reporting charging information.

With reference to any one of the first aspect or the first to the third possible implementations of the first aspect, in a fourth possible implementation, processing, by the client, the granted quota and the remaining quota on the client based on the indication information, and reporting the information of the usage of the processed quota when the reporting condition is met includes: when receiving the indication information, stopping using, by the client, the remaining quota, and starting to use the granted quota, and reporting, by the client, information of usage of the remaining quota and information of usage of the granted quota when reporting charging information.

When the client requests a new quota from the server, the server sends a granted quota and indication information to the client, so that the client can perform processing such as combination or conversion on the granted quota and a remaining quota, and then report usage information of a combined quota based on a processing result, or report usage information of the granted quota and usage information of the remaining quota. Therefore, application for quota and grant of quota are more appropriate, frequent quota grant processes are effectively reduced, and a network burden is relieved. In addition, a service delay is shortened, and it is ensured that a quota used for a service does not exceed a granted quota.

With reference to any one of the first aspect or the first to the fourth possible implementations of the first aspect, in a fifth possible implementation, the method includes: further sending, by the client to the server, a charging request that carries information of quota usage but does not carry quota request information; and clearing, by the client, a remaining quota, and suspending a service data flow, where the remaining quota that is cleared is a difference between a granted quota and the quota usage carried in the charging request that does not carry the quota request information.

With reference to any one of the first aspect or the first to the fifth possible implementations of the first aspect, in a sixth possible implementation, the method includes: further sending, by the client to the server, a charging request that carries a quota reclaim indicator and information of quota usage; and clearing, by the client, a remaining quota, and suspending a service data flow, where the remaining quota that is cleared is a difference between the granted quota and the quota usage carried in the charging request that carries the quota reclaim indicator.

The remaining quota is reclaimed when the client does not need to continue to use the quota.

With reference to any one of the first aspect or the first to the sixth possible implementations of the first aspect, in a seventh possible implementation, the method includes:

when the client receives failure indication information of granting from the server, reporting, by the client, information of usage of the remaining quota based on the failure indication information of granting after using up the remaining quota.

With reference to any one of the first aspect or the first to the seventh possible implementations of the first aspect, in an eighth possible implementation, the method includes: when the client receives failure indication information of granting from the server, stopping using, by the client, the remaining quota, and reporting information of usage of the remaining quota.

With reference to any one of the first aspect or the first to the eighth possible implementations of the first aspect, in a ninth possible implementation, before sending, by a client, the charging request to the server, or after reporting, by the client, the information of the usage of the processed quota, the method includes: sending, by the client to the server, a charging request that carries information of quota usage but does not carry quota request information, so that the server deducts the carried quota usage from a granted quota, and uses a remaining part obtained after the deduction as a remaining quota; and continuing to use, by the client, the remaining quota obtained after the deduction.

The server sometimes grants a relatively large quota. If a remaining quota is reclaimed and a new quota is granted, once a trigger event occurs, a network burden is increased. In this manner, when some trigger events occur, the server does not need to grant a new quota, thereby relieving a network burden.

According to a second aspect, a quota management method is provided, including: receiving, by a server, a charging request from a client, where the charging request carries quota request information and information of quota usage; and sending, by the server, a granted quota and indication information to the client, where the indication information indicates processing the granted quota and a remaining quota on the client, and the remaining quota is a difference between a quota granted by the server last time and the quota usage in the charging request.

With reference to implementations of the second aspect, in a first possible implementation of the second aspect, that processing the granted quota and a remaining quota on the client includes: combining the granted quota and the remaining quota on the client.

With reference to the second aspect or the first possible implementation of the second aspect, in a second possible implementation, the indication information includes a quota conversion coefficient, and indicating the client to combine the granted quota and the remaining quota on the client includes: indicating the client to convert, based on the quota conversion coefficient, an available remaining quota when the client receives the indication information, and to combine the granted quota and the converted available remaining quota.

With reference to any one of the second aspect or the first and the second possible implementations of the second aspect, in a third possible implementation, that processing the granted quota and the remaining quota on the client includes: using the granted quota after using up the remaining quota.

With reference to any one of the second aspect or the first to the third second possible implementations of the second aspect, in a fourth possible implementation, that processing the granted quota and a remaining quota on the client includes: stopping using the remaining quota and start to use the granted quota when receiving the indication information.

When the client requests a new quota from the server, the server sends a granted quota and indication information to the client, so that the client can perform processing such as combination or conversion on the granted quota and a remaining quota, and then report usage information of a combined quota based on a processing result, or report usage information of the granted quota and usage information of the remaining quota. Therefore, application for quota and grant of quota are more appropriate, frequent quota grant processes are effectively reduced, and a network burden is relieved. In addition, a service delay is shortened, and it is ensured that a quota used for a service does not exceed a granted quota.

With reference to any one of the second aspect or the first to the fourth possible implementations of the second aspect, in a fifth possible implementation, the method includes: when the server receives a charging request that carries information of quota usage but does not carry quota request information, returning, by the server, a remaining quota to a user account, where the returned remaining quota is a difference between a granted quota and the quota usage carried in the charging request that does not carry the quota request information.

With reference to any one of the second aspect or the first to the fifth possible implementations of the second aspect, in a sixth possible implementation, the method includes: when the server receives a charging request that carries a quota reclaim indicator and information of quota usage from the client, returning, by the server, a remaining quota to a user account, where the returned remaining quota is a difference between the granted quota and the quota usage carried in the charging request that does not carries the quota reclaim indicator.

The remaining quota is reclaimed when the client does not need to continue to use the quota.

With reference to any one of the second aspect or the first to the sixth possible implementations of the second aspect, in a seventh possible implementation, the method includes: when the server fails to grant a quota, sending, by the server, failure indication information of granting to the client, where the failure indication information of granting is used to indicate the client to report information of usage of the remaining quota after using up the remaining quota.

With reference to any one of the second aspect or the first to the seventh possible implementations of the second aspect, in an eighth possible implementation, the method includes: when the server fails to grant a quota, sending, by the server, failure indication information of granting to the client, where the failure indication information of granting is used to indicate the client to stop using the remaining quota and report information of usage of the remaining quota when receiving the failure indication information of granting.

With reference to any one of the second aspect or the first to the eighth possible implementations of the second aspect, in a ninth possible implementation, before receiving, by a server, a charging request from a client, or after sending, by the server, a granted quota and indication information to the client, the method includes: when the server receives, from the client, a charging request that carries information of quota usage but does not carry quota request information, deducting, by the server, the carried quota usage from a granted quota, using a remaining part obtained after the deduction as a remaining quota, and deducting usage from a user account based on the carried information of the quota usage.

According to a third aspect, a quota management method is provided, including: sending, by a client, a charging request to a server, where the charging request carries quota request information and information of quota usage; receiving, by the client, a granted quota from the server; using, by the client, the granted quota after using up a remaining quota, where the remaining quota is a difference between a quota granted by the server last time and the quota usage in the charging request; and reporting, by the client, information of usage of the remaining quota and information of usage of the granted quota.

According to a fourth aspect, a quota management method is provided, including: sending, by a client, a charging request to a server, where the charging request carries quota request information and information of quota usage; receiving, by the client, a granted quota from the server; stopping using, by the client, a remaining quota, and starting to use the granted quota, where the remaining quota is a difference between a quota granted by the server last time and the quota usage in the charging request; and reporting, by the client, information of usage of the remaining quota and information of usage of the granted quota.

With reference to implementations of the third aspect and the fourth aspect, in a first implementation, the method includes: further sending, by the client to the server, a charging request that carries information of quota usage but does not carry quota request information; and clearing, by the client, a remaining quota, and suspending a service data flow, where the remaining quota that is cleared is a difference between a granted quota and the quota usage carried in the charging request that does not carry the quota request information.

With reference to implementations of the third aspect and the fourth aspect, in another implementation, the method includes: when the client receives failure indication information of granting from the server, reporting, by the client, information of usage of the remaining quota based on the failure indication information of granting after using up the remaining quota.

With reference to implementations of the third aspect and the fourth aspect, in still another implementation, the method includes: when the client receives failure indication information of granting from the server, stopping using, by the client, the remaining quota, and reporting, by the client, information of usage of the remaining quota.

According to a fifth aspect, a client is provided, including a sending module, a receiving module, and a processing module, where the sending module is configured to send a charging request to a server, where the charging request carries quota request information and information of quota usage; the receiving module is configured to receive a granted quota and indication information from the server; the processing module is configured to process the granted quota and a remaining quota on the client based on the indication information, where the remaining quota is a difference between a quota granted by the server last time and the quota usage in the charging request; the processing module is further configured to use a processed quota; and the sending module is further configured to report information of usage of the processed quota when a reporting condition is met.

With reference to implementations of the fifth aspect, in a first possible implementation of the fifth aspect, that the processing module is configured to process the granted quota and the remaining quota on the client based on the indication information, and the sending module is configured to report the information of the usage of the processed quota when the reporting condition is met include: the processing module is configured to combine the granted quota and the remaining quota, and the sending module is configured to report information of usage of a combined quota when the client reports charging information.

With reference to the fifth aspect or the first possible implementation of the fifth aspect, in a second possible implementation, the indication information includes a quota conversion coefficient, and that the processing module is configured to combine the granted quota and the remaining quota on the client includes: the processing module is configured to: convert, based on the quota conversion coefficient, an available remaining quota when the receiving module receives the indication information, and combine the granted quota and the converted available remaining quota; and the sending module further reports, when reporting the charging information, information of usage of the remaining quota that is obtained when the indication information is received.

With reference to any one of the fifth aspect or the first and the second possible implementations of the fifth aspect, in a third possible implementation, that the processing module is configured to process the granted quota and the remaining quota on the client based on the indication information, and the sending module is configured to report the information of the usage of the processed quota when the reporting condition is met includes: the processing module is configured to use, based on the indication information, the granted quota after using up the remaining quota, and the sending module is configured to report information of usage of the remaining quota and information of usage of the granted quota when reporting charging information.

With reference to any one of the fifth aspect or the first to the third possible implementations of the fifth aspect, in a fourth possible implementation, that the processing module is configured to process the granted quota and the remaining quota on the client based on the indication information, and the sending module is configured to report the information of the usage of the processed quota when the reporting condition is met include: the processing module is configured to: when the indication information is received, stop using the remaining quota, and start to use the granted quota, and the sending module is configured to report information of usage of the remaining quota and information of usage of the granted quota when reporting charging information.

With reference to any one of the fifth aspect or the first to the fourth possible implementations of the fifth aspect, in a fifth possible implementation, the sending module is further configured to send, to the server, a charging request that carries information of quota usage, but does not carry quota request information; and the processing module is further configured to: clear a remaining quota, and suspend a service data flow, where the remaining quota that is cleared is a difference between a granted quota and the quota usage carried in the charging request that does not carry the quota request information.

With reference to any one of the fifth aspect or the first to the fifth possible implementations of the fifth aspect, in a sixth possible implementation, the sending module is further configured to send, to the server, a charging request that carries a quota reclaim indicator and information of quota usage; and the processing module is further configured to: clear a remaining quota, and suspend a service data flow, where the remaining quota that is cleared is a difference between a granted quota and the quota usage carried in the charging request that carries the quota reclaim indicator.

With reference to any one of the fifth aspect or the first to the sixth possible implementations of the fifth aspect, in a seventh possible implementation, when the receiving module receives failure indication information of granting from the server, the sending module reports information of usage of the remaining quota based on the failure indication information of granting after the processing module uses up the remaining quota.

With reference to any one of the fifth aspect or the first to the seventh possible implementations of the fifth aspect, in an eighth possible implementation, when the receiving module receives failure indication information of granting from the server, the processing module stops using the remaining quota, and the sending module reports information about a usage of the remaining quota.

With reference to any one of the fifth aspect or the first to the eighth possible implementations of the fifth aspect, in a ninth possible implementation, before sending module sends the charging request to the server, or after sending module reports the information of the usage of the processed quota, the sending module is further configured to send, to the server, a charging request that carries information of quota usage but does not carry quota request information, so that the server deducts the carried quota usage from the granted quota, and uses a remaining part obtained after the deduction as a remaining quota; and the processing module continues to use the remaining quota obtained after the deduction.

According to a sixth aspect, a server is provided, including a receiving module and a sending module, where the receiving module is configured to receive a charging request from a client, where the charging request carries quota request information and information of quota usage; and the sending module is configured to send a granted quota and indication information to the client, where the indication information indicates processing the granted quota and a remaining quota on the client, and the remaining quota is a difference between a quota granted by the server last time and the quota usage in the charging request.

With reference to implementations of the sixth aspect, in a first possible implementation of the sixth aspect, that processing the granted quota and the remaining quota on the client includes: combining the granted quota and the remaining quota on the client.

With reference to the sixth aspect or the first possible implementation of the sixth aspect, in a second possible implementation, the indication information includes a quota conversion coefficient, and combining the granted quota and the remaining quota on the client includes: converting, based on the quota conversion coefficient, an available remaining quota when the client receives the indication information, and combining the granted quota and the converted available remaining quota.

With reference to any one of the sixth aspect or the first and the second possible implementations of the sixth aspect, in a third possible implementation, that processing the granted quota and the remaining quota on the client includes: using the granted quota after using up the remaining quota.

With reference to any one of the sixth aspect or the first to the third second possible implementations of the sixth aspect, in a fourth possible implementation, that processing the granted quota and the remaining quota on the client includes: stopping using the remaining quota and start to use the granted quota when receiving the indication information.

With reference to any one of the sixth aspect or the first to the fourth possible implementations of the sixth aspect, in a fifth possible implementation, when the receiving module receives a charging request that carries information of quota usage but does not carry quota request information, the sending module returns a remaining quota to a user account, where the returned remaining quota is a difference between a granted quota and the quota usage carried in the charging request that does not carry the quota request information.

With reference to any one of the sixth aspect or the first to the fifth possible implementations of the sixth aspect, in a sixth possible implementation, when the receiving module receives a charging request that carries a quota reclaim indicator and information of quota usage from the client, the sending module returns a remaining quota to a user account, where the returned remaining quota is a difference between the granted quota and the quota usage carried in the charging request that carries the quota reclaim indicator.

With reference to any one of the sixth aspect or the first to the sixth possible implementations of the sixth aspect, in a seventh possible implementation, when granting a quota fails, the sending module is configured to send failure indication information of granting to the client, where the failure indication information of granting is used to indicate the client to report information of usage of the remaining quota after using up the remaining quota.

With reference to any one of the sixth aspect or the first to the seventh possible implementations of the sixth aspect, in an eighth possible implementation, when granting a quota fails, the sending module is configured to send failure indication information of granting to the client, where the failure indication information of granting is used to indicate the client to stop using the remaining quota and report information of usage of the remaining quota when receiving the failure indication information of granting.

With reference to any one of the sixth aspect or the first to the eighth possible implementations of the sixth aspect, in a ninth possible implementation, the server further includes a processing module, and before receiving module receives the charging request from the client, or after sending module sends the granted quota and the indication information to the client, when the receiving module receives, from the client, a charging request that carries information of quota usage but does not carry quota request information, the processing module is configured to: deduct the carried quota usage from the granted quota, use a remaining part obtained after the deduction as a remaining quota, and deduct usage from a user account based on the carried information of the quota usage.

According to a seventh aspect, a client is provided, including a sending module, a receiving module, and a processing module, where the sending module is configured to send a charging request to a server, where the charging request carries quota request information and information of quota usage; the receiving module is configured to receive a granted quota from the server; the processing module is configured to use the granted quota after using up a remaining quota, where the remaining quota is a difference between a quota granted by the server last time and the quota usage in the charging request; and the sending module is further configured to report information of usage of the remaining quota and information of usage of the granted quota.

According to an eighth aspect, a client is provided, including a sending module, a receiving module, and a processing module, where the sending module is configured to send a charging request to a server, where the charging request carries quota request information and information of quota usage; the receiving module is configured to receive a granted quota from the server; the processing module is configured to: stop using a remaining quota, and start to use the granted quota, where the remaining quota is a difference between a quota granted by the server last time and the quota usage in the charging request; and the sending module is further configured to report information of usage of the remaining quota and information of usage of the granted quota.

With reference to implementations of the seventh aspect and the eighth aspect, in a first implementation, the sending module is further configured to send, to the server, a charging request that carries information of quota usage but does not carry quota request information; and the processing module is further configured to: clear a remaining quota, and suspend a service data flow, where the remaining quota that is cleared is a difference between a granted quota and the quota usage carried in the charging request that does not carry the quota request information.

With reference to implementations of the seventh aspect and the eighth aspect, in another implementation, when the receiving module receives failure indication information of granting from the server, the sending module is configured to report information of usage of the remaining quota based on the failure indication information of granting after the processing module uses up the remaining quota.

With reference to implementations of the seventh aspect and the eighth aspect, in still another implementation, when the receiving module receives failure indication information of granting from the server, the processing module is configured to stop using the remaining quota, and the sending module reports information of usage of the remaining quota.

According to a ninth aspect, a computing device is provided, including a processor, a memory, a bus, and a communication interface, where the memory is configured to store computing device executable instructions, the processor and the memory are connected by using the bus, and when the computing device runs, the processor executes the computing device executable instructions stored in the memory, so that the computing device performs the method according to any one of the first aspect to the fourth aspect and the possible implementations of the first aspect to the fourth aspect.

Still another aspect of this application provides a computer program product that includes an instruction. When the computer program product runs on a computer, the computer performs the methods in the foregoing aspects.

According to the technical solutions provided in the embodiments of this application, when the client requests a new quota from the server, the server sends a granted quota and indication information to the client, so that the client can perform processing such as combination or conversion on the granted quota and a remaining quota, and then report usage information of a combined quota based on a processing result, or report usage information of the granted quota and usage information of the remaining quota. Therefore, application for quota and grant of quota are more appropriate, frequent quota grant processes are effectively reduced, and a network burden is relieved. In addition, a service delay is shortened, and it is ensured that a quota used for a service does not exceed a granted quota.

BRIEF DESCRIPTION OF THE DRAWINGS

To describe the technical solutions in the embodiments of this application, the following briefly describes the accompanying drawings required for describing the embodiments or the current system.

DETAILED DESCRIPTION OF ILLUSTRATIVE EMBODIMENTS

Figure 1:
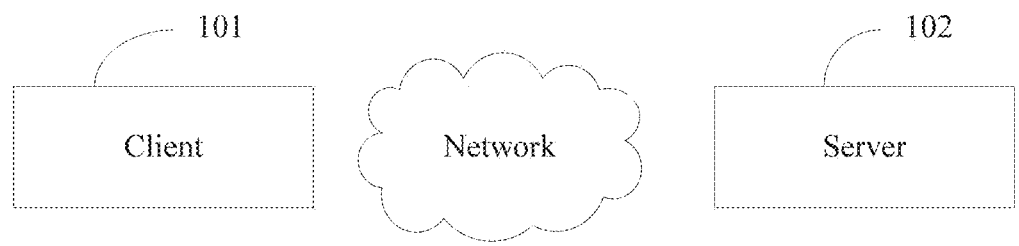
FIG. 1 is a schematic diagram of a network architecture to which the embodiments of this application are applied.

FIG. 1 is a schematic diagram of a network architecture to which the embodiments of this application are applied. A client 101 is a network device that uses the Diameter protocol for communication, and may be referred to as a credit-control client, for example, may be a gateway. A server 102 is a network device that uses the Diameter protocol for communication, and may be referred to as a credit-control server, for example, may be an online charging system (OCS). The client 101 requests to the server 102 for a quota to be used for a service. The server 102 grants a quota to the client 101, and performs charging based on quota usage reported by the client 101. The quota refers to a quantity of quota types that are granted by the server 102 to the client 101 and that are to be used for a service. If the quota type is traffic, the quota is an amount of granted traffic (for example, traffic of 5 M). If the quota type is duration, the quota is granted duration (for example, 30 minutes). In the current system, when a credit-control client reports information of quota usage to a credit-control server, and requests the credit-control server to grant a new quota, the credit-control server reclaims a remaining quota on the credit-control client, and grants a new quota. Consequently, a problem such as a service delay is caused. In this application, when the client 101 reports the quota usage to the server 102, and requests the server 102 to grant a new quota, a remaining quota on the client 101 can be valid, and the remaining quota is not reclaimed due to the reporting. Therefore, problems such as a service delay and frequent quota grant are resolved.

Figure 2:
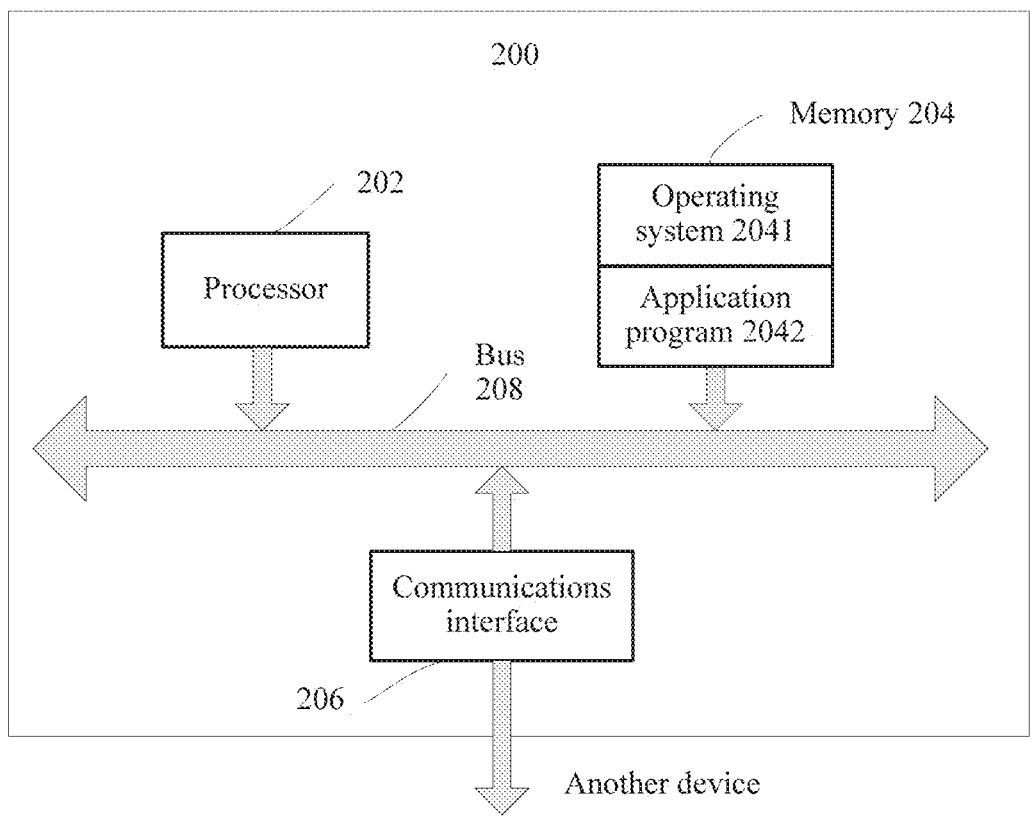
FIG. 2 is a schematic structural diagram of hardware of a computer device 200 according to an embodiment of this application.

The client 101 and the server 102 may be implemented in a form of a computer device. FIG. 2 is a schematic structural diagram of hardware of a computer device 200 according to an embodiment of this application. As shown in FIG. 2, the computer device 200 includes a processor 202, a memory 204, a communication interface 206, and a bus 208. The processor 202, the memory 204, and the communication interface 206 are communicatively connected to each other by using the bus 208.

The processor 202 may be a general-purpose central processing unit (CPU), a microprocessor, an application-specific integrated circuit (ASIC), or one or more integrated circuits, and is configured to execute a related program, so as to implement the technical solutions provided in the embodiments of this application.

The memory 204 may be a read-only memory (ROM), a static storage device, a dynamic storage device, or a random access memory (RAM). The memory 204 may store an operating system 2041 and another application program 2042. When the technical solutions provided in the embodiments of this application are implemented by using software or firmware, program code used to implement the technical solutions provided in the embodiments of this application is stored in the memory 204, and is executed by the processor 202.

The communication interface 206 communicates with another device or a communications network by using, for example, without limitation, a transceiver apparatus such as a transceiver.

The bus 208 may include a channel through which information is transmitted between components (for example, the processor 202, the memory 204, and the communication interface 206).

Figure 3:
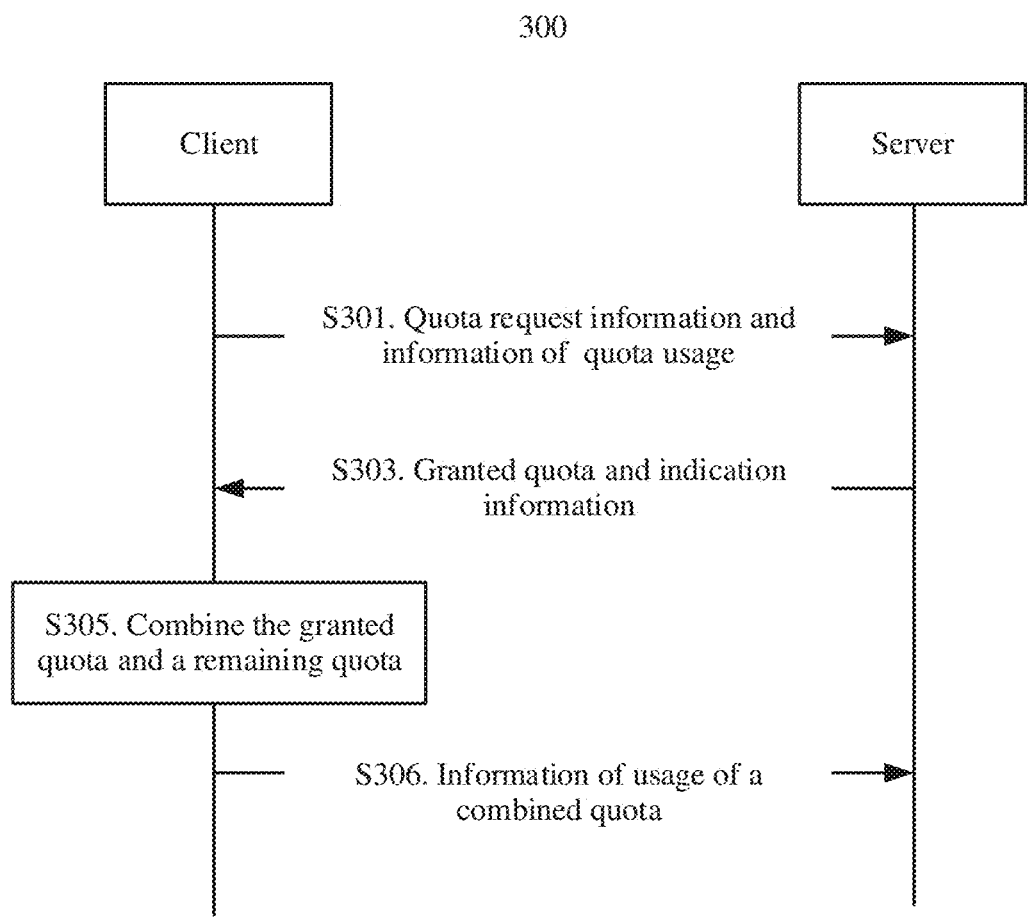
FIG. 3 is an example flowchart of a quota management method 300 according to an embodiment of this application.
Figure 4:
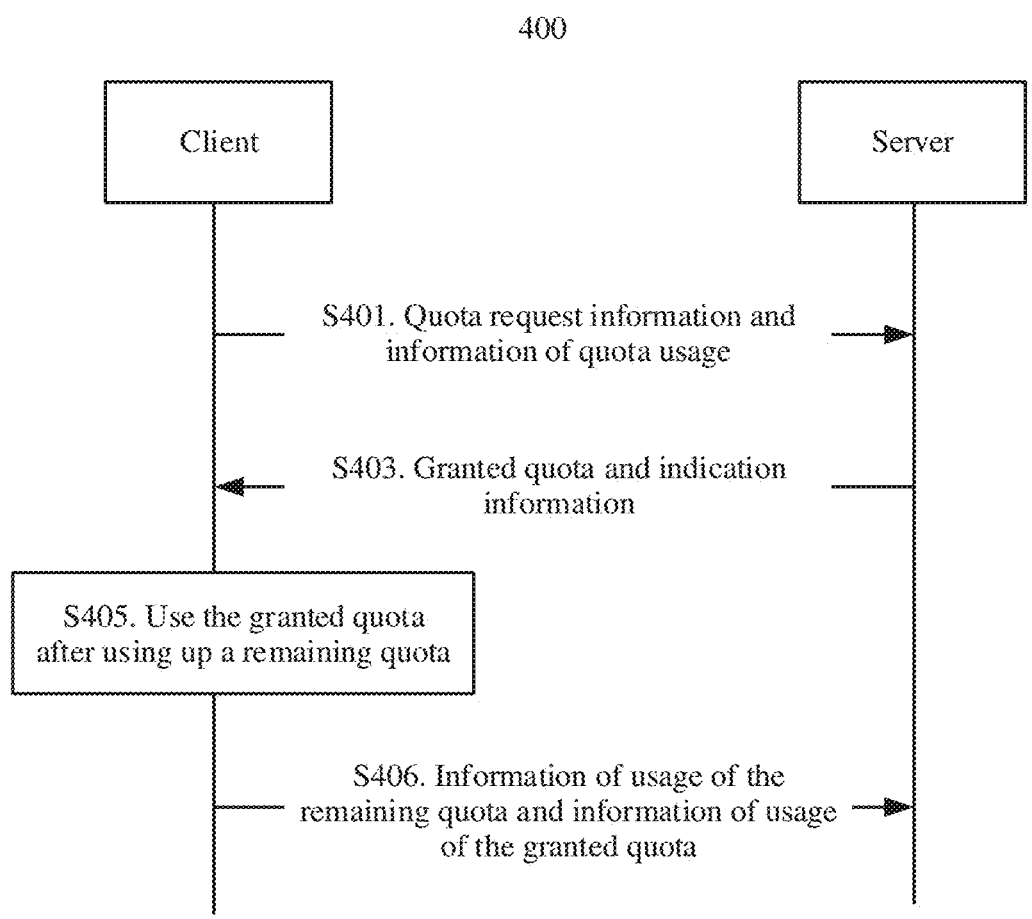
FIG. 4 is an example flowchart of a quota management method 400 according to an embodiment of this application.
Figure 5:
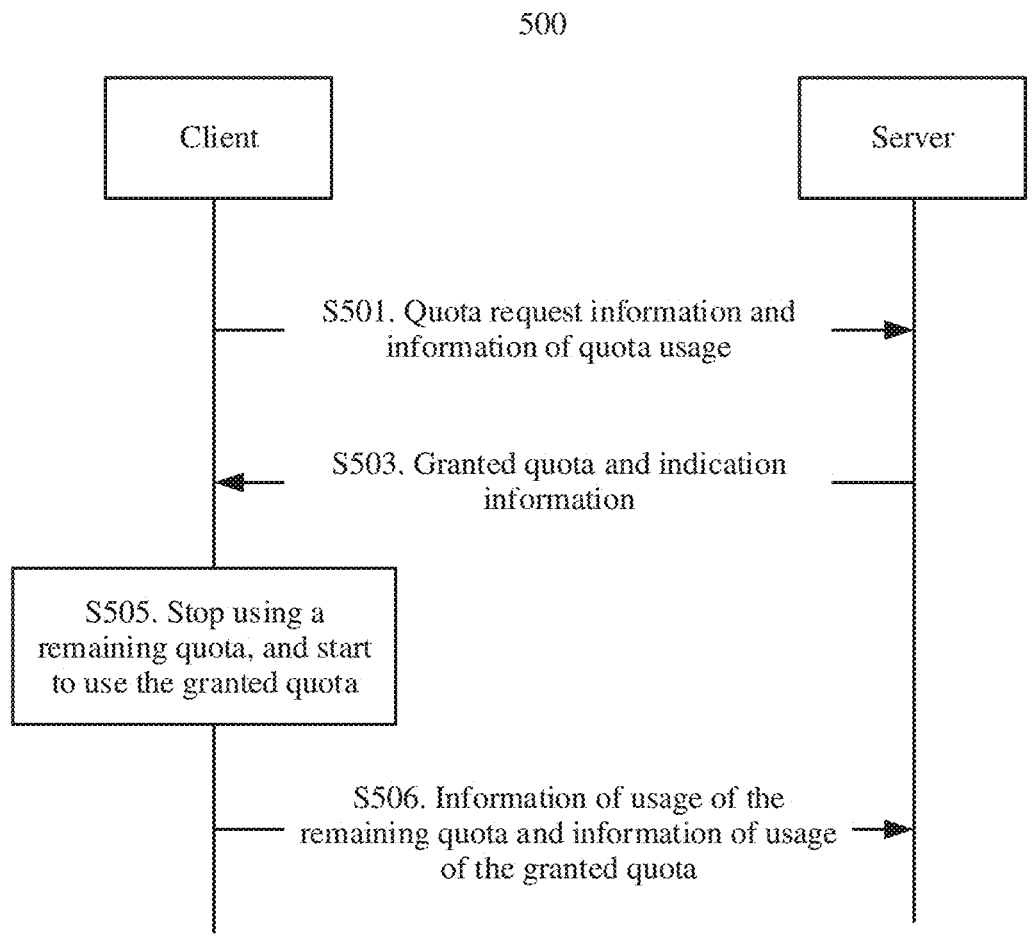
FIG. 5 is an example flowchart of a quota management method 500 according to an embodiment of this application.

When the client 101 is implemented by using the computer device 200, the processor 202 is configured to execute the program code that is stored in the memory 204 and that is used to implement the technical solutions provided in the embodiments of this application, so as to implement the methods shown in the embodiments in FIG. 3 to FIG. 5.

When the server 102 is implemented by using the computer device 200, the processor 202 is configured to execute the program code that is stored in the memory 204 and that is used to implement the technical solutions provided in the embodiments of this application, so as to implement the methods shown in the embodiments in FIG. 3 to FIG. 5.

A quota management method provided in this application is described below with reference to several embodiments. In the following embodiments, operations such as quota processing, reporting, and return are specific to quotas of a same rating group or a same service identifier. It may be understood that processing methods for quotas of another rating group or service identifier are the same.

FIG. 3 is an example flowchart of a quota management method 300 according to an embodiment of this application. In a specific implementation process, the quota management method 300 may be performed by the client 101 and the server 102 shown in FIG. 1.

When there is a service flow on the client, the client requests to the server for a quota to be used for the service, and reports a used quota of the service to the server.

S301. The client sends a charging request to the server, where the charging request carries quota request information and information of quota usage.

Specifically, the client may send the charging request to the server when a trigger event defined in RFC 4006 occurs, or a trigger event defined in 3GPP TS 32.251 occurs. The trigger event defined in 3GPP TS 32.251 includes, for example, a case in which an available quota on a client is less than a threshold, and an access network type is switched.

S302. The server receives the charging request from the client, where the charging request carries the quota request information and the information of the quota usage.

The server determines, based on the received quota request information, that the client still desires to use a quota. Therefore, the server keeps a remaining quota on the client valid, and does not reclaim the remaining quota on the client. The client may continue to use the remaining quota. The server may keep the remaining quota on the client valid in the following manner: The server does not return the remaining quota to a user account.

S303. The server sends a granted quota and indication information to the client, where the indication information is used to indicate the client to combine the granted quota and the remaining quota.

Optionally, before sending the granted quota to the client, the server determines whether the granted quota and the remaining quota on the client can be combined. In this embodiment, the server determines that the granted quota and the remaining quota on the client can be combined. Therefore, the indication information is used to indicate the client to combine the granted quota and the remaining quota. When the remaining quota and the granted quota have a same type and a same unit price, the remaining quota and the granted quota can be combined. For example, the remaining quota is traffic, and has a unit price of 1 yuan/Mbit, and the granted quota is also traffic, and has a unit price of 1 yuan/Mbit. In this case, the types and the unit prices of the remaining quota are the same as those of the granted quota. Therefore, the remaining quota and the granted quota can be combined. In addition, when the remaining quota and the granted quota have different types or different unit prices, but conversion can be performed between the remaining quota and the granted quota, the converted remaining quota and the granted quota can be combined. This case is described below in detail.

When the granted quota and the remaining quota on the client can be combined, the server combines the granted quota and the remaining quota on the client, and saves a combined quota, so as to perform a deduction from the combined quota during subsequent charging. The server may determine, based on a reporting reason sent by the client or configuration information on the server, whether the granted quota and the remaining quota on the client can be combined.

In this embodiment, the indication information used to indicate the client to combine the remaining quota and the granted quota is indicated in two manners: a manner in which an indication parameter is delivered and a manner in which no indication parameter is delivered. In a first manner, a value of the indication parameter is used to indicate the client to combine the remaining quota and the granted quota. For example, a possible value of the indication parameter is 1, 2, or 3. The value 2 means that the client is indicated to combine the remaining quota and the granted quota. The value 1 means that the client is indicated to use the granted quota after using up the remaining quota. The value 3 means that the client is indicated to stop using the remaining quota and start to use the granted quota when receiving the indication information. In a second manner, if the client receives no indication parameter, the client determines that the remaining quota and the granted quota should be combined. If the client receives an indication parameter, the client determines not to combine the remaining quota and the granted quota, and performs processing based on an indication of the indication parameter. For example, if the client receives the indication parameter, and a value of the indication parameter is 1, the client uses the granted quota after using up the remaining quota.

The granted quota and the indication information that are sent by the server to the client may be carried in a credit control answer (CCA).

In an example, it is assumed that a type of the granted quota is traffic, and a type of the remaining quota is also traffic. In this case, information carried in the CCA includes the following fields:

Multiple-Services-Credit-Control,
Granted-Service-Unit,
CC-Total-Octets,
Unit-Usage-Indicator, and
Rating-Group.

The Multiple-Services-Credit-Control is a multiple-services-credit-control field, and includes the Granted-Service-Unit field and the Rating-Group field. The Granted-Service-Unit field is information about the granted quota, the included CC-Total-Octets field is a total amount of the granted traffic, and the included Unit-Usage-Indicator field is the indication information, and is used to indicate the client to combine the granted traffic and the remaining traffic on the client. The Rating-Group is a rating-group field.

S304. The client receives the granted quota and the indication information from the server.

Specifically, after the granted quota from the server is received, available quotas on the client are a current remaining quota and the granted quota from the server.

S305. The client combines the granted quota and the remaining quota on the client.

For example, when the client sends the quota request information, the remaining quota is traffic of 5 Mbit, and has a unit price of 1 yuan/Mbit, and the granted quota is traffic of 10 Mbit, and has a unit price of 1 yuan/Mbit. The client combines the remaining quota 5 Mbit and the granted quota 10 Mbit, and obtains a combined quota 15 Mbit.

When conversion can be performed between the remaining quota and the granted quota, the remaining quota and the granted quota can be combined. When conversion can be performed between the remaining quota and the granted quota, the indication information includes a quota conversion coefficient. The client first converts, based on the quota conversion coefficient, an available remaining quota when the client receives the indication information, and then combines the granted quota and the converted available remaining quota. The quota conversion coefficient is determined by the server. Conversion can be performed based on the quota conversion coefficient in the following case: a case in which quotas have different unit prices, but conversion can be performed between the unit prices of the quotas, or a case in which quotas have different types, but conversion can be performed between the types of the quotas. For example, when the client sends the quota request information, the remaining quota is traffic of 5 Mbit, and has a unit price of 1 yuan/Mbit, and the granted quota is traffic of 10 Mbit, and has a unit price of 2 yuan/Mbit, and the quota conversion coefficient is 2. In this case, the unit prices of the remaining quota and the granted quota are different, but conversion can be performed between the unit prices of the quotas. When receiving the indication information, the client has used 2 Mbit in the remaining quota 5 Mbit. Therefore, in this case, the available remaining quota on the client is 3 Mbit. The client performs calculation based on the quota conversion coefficient, and obtains the converted available remaining quota 3 Mbit/2=1.5 Mbit. The client combines the converted available remaining quota 1.5 Mbit and the granted quota 10 Mbit, and obtains the combined quota 11.5 Mbit.

S306. The client reports information of usage of a combined quota.

The client uses the combined quota. When a reporting condition is met, the client reports the information of the usage of the combined quota to the server. During reporting, the client does not make a distinction between usage information of the original remaining quota and usage information of the granted quota delivered by the server. When the trigger event defined in RFC 4006 occurs, or the trigger event defined in 3GPP TS 32.251 occurs, the reporting condition is met.

When conversion can be performed between the remaining quota and the granted quota, in addition to the information of the usage of the combined quota, the client reports information of usage of the remaining quota. The usage of the remaining quota refers to usage information of an unconverted part of the remaining quota.

The client may add the information about the usage of the combined quota to a credit control request (CCR).

According to the technical solution provided in this embodiment of this application, when the client requests a new quota from the server, the server sends a granted quota and indication information to the client, so that the client can combine the granted quota and a remaining quota, and then report usage information of a combined quota. Therefore, application for quota and grant of quota are more appropriate, frequent quota grant processes are effectively reduced, and a network burden is relieved. In addition, a service delay is shortened, and it is ensured that a quota used for a service does not exceed a granted quota.

FIG. 4 is an example flowchart of a quota management method 400 according to an embodiment of this application. In a specific implementation process, the quota management method 400 may be performed by the client 101 and the server 102 shown in FIG. 1.

When there is a service flow on the client, the client applies to the server for a quota to be used for the service, and reports a used quota of the service to the server.

S401. The client sends a charging request to the server, where the charging request carries quota request information and information of quota usage.

S402. The server receives the charging request from the client, where the charging request carries the quota request information and the information of the quota usage.

For specific content of S401 and S402, refer to S301 and S302 in the embodiment in FIG. 3. Details are not described herein.

S403. The server sends a granted quota and indication information to the client, where the indication information is used to indicate the client to use the granted quota after using up the remaining quota.

Optionally, before sending the granted quota to the client, the server determines whether the granted quota and the remaining quota on the client can be combined. In this embodiment, the server determines that the granted quota and the remaining quota on the client cannot be combined. Therefore, the indication information is used to indicate the client to use the granted quota after using up the remaining quota. When the remaining quota and the granted quota have different types, and no conversion can be performed, the remaining quota and the granted quota cannot be combined.

When the granted quota and the remaining quota on the client cannot be combined, the server saves the granted quota and the remaining quota on the client, so as to separately perform a deduction from the granted quota and the remaining quota during subsequent charging. The server may determine, based on a reporting reason sent by the client or configuration information on the server, whether the granted quota and the remaining quota on the client can be combined.

The indication information used to require the client to use the granted quota after using up the remaining quota may be indicated by delivering an indication parameter. For details, refer to a related example in S303 in the embodiment in FIG. 3. Details are not described herein.

The granted quota and the indication information that are sent by the server to the client may be carried in a CCA.

In an example, it is assumed that a type of the granted quota is traffic, a type of the remaining quota is duration, and no conversion can be performed between the granted traffic and the remaining duration. In this case, information carried in the CCA includes the following fields:

Multiple-Services-Credit-Control,
Granted-Service-Unit,

CC-Total-Octets,
Unit-Usage-Indicator, and
Rating-Group.

The Multiple-Services-Credit-Control is a multiple-services-credit-control field, and includes the Granted-Service-Unit field and the Rating-Group field. The Granted-Service-Unit field is information about the granted quota, the included CC-Total-Octets field is a total amount of the granted traffic, and the included Unit-Usage-Indicator field is the indication information, and is used to indicate the client to use the granted traffic after using up the remaining duration.

S404. The client receives the granted quota and the indication information from the server.

Specifically, after the granted quota from the server is received, available quotas on the client are a current remaining quota and the granted quota from the server.

S405. The client uses the granted quota after using up the remaining quota.

For example, the remaining quota is duration of 5 minutes, and the granted quota is traffic of 10 Mbit. After receiving the indication information from the server, the client first uses up the remaining duration of 5 minutes before using the granted traffic of 10 Mbit.

S406. The client reports information of usage of the remaining quota and information of usage of the granted quota.

During reporting, the client makes a distinction between usage information of the original remaining quota and usage information of the granted quota delivered by the server. When a trigger event defined in RFC 4006 occurs, or a trigger event defined in 3GPP TS 32.251 occurs, a reporting condition is met. The client may add the information of the usage of the remaining quota and the information of the usage of the granted quota to a CCR.

In an example, it is assumed that the type of the remaining quota is duration, and the type of the granted quota is traffic. In this case, information carried in the CCR includes the following fields:
Multiple-Services-Credit-Control,
Used-Service-Unit,
Original-Remain-Usage,
CC-Time,
Used-Service-Unit,
CC-Total-Octets, and
Rating-Group.

The Used-Service-Unit field that includes the Original-Remain-Usage and the CC-Time is a usage information field of the remaining quota, the Original-Remain-Usage is used to indicate that the Usage-Service-Unit field is the usage information field of the remaining quota, and the CC-Time is the usage of the remaining duration. The Used-Service-Unit field that includes the CC-Total-Octets is a usage information field of the granted quota, and the CC-Total-Octets is the usage of the granted traffic.

In another example, it is assumed that the type of the remaining quota is duration, and the type of the granted quota is traffic. In this case, information carried in the CCR includes the following fields:
Multiple-Services-Credit-Control,
Used-Service-Unit,
Tariff-Change-Usage,
CC-Time,
Used-Service-Unit,
Tariff-Change-Usage,
CC-Total-Octets, and
Rating-Group.

The Used-Service-Unit field that includes the CC-Time is a usage information field of the remaining quota, and is indicated by a value of the Tariff-Change-Usage. The Used-Service-Unit field that includes the CC-Total-Octets is a usage information field of the granted quota, and is indicated by a value of the Tariff-Change-Usage. The value of the Tariff-Change-Usage may be set to 0 to indicate that the Used-Service-Unit field is the usage information field of the remaining quota, and may be set to 1 to indicate that the Used-Service-Unit field is the usage information field of the granted quota. Alternatively, the value of the Tariff-Change-Usage may be set to 1 to indicate that the Used-Service-Unit field is the usage information field of the remaining quota, and may be set to 0 to indicate that the Used-Service-Unit field is the usage information field of the granted quota.

According to the technical solution provided in this embodiment of this application, when the client requests a new quota from the server, the server sends a granted quota and indication information to the client, so that the client can use the granted quota after using up a remaining quota, and then report usage information of the remaining quota and usage information of the granted quota. Therefore, application for quota and grant of quota are more appropriate, frequent quota grant processes are effectively reduced, and a network burden is relieved. In addition, a service delay is shortened, and it is ensured that a quota used for a service does not exceed a granted quota.

FIG. 5 is an example flowchart of a quota management method 500 according to an embodiment of this application. In a specific implementation process, the quota management method 500 may be performed by the client 101 and the server 102 shown in FIG. 1.

When there is a service flow on the client, the client applies to the server for a quota to be used for the service, and reports a used quota of the service to the server.

S501. The client sends a charging request to the server, where the charging request carries quota request information and information of quota usage.

S502. The server receives the charging request from the client, where the charging request carries the quota request information and the information of the quota usage.

For specific content of S501 and S502, refer to S301 and S302 in the embodiment in FIG. 3 and S401 and S402 in the embodiment in FIG. 4. Details are not described herein.

S503. The server sends a granted quota and indication information to the client, where the indication information is used to indicate the client to stop using a remaining quota on the client and start to use the granted quota.

Optionally, before sending the granted quota to the client, the server determines whether the granted quota and the remaining quota on the client can be combined. In this embodiment, the server determines that the granted quota and the remaining quota on the client cannot be combined. Therefore, the indication information is used to indicate the client to stop using the remaining quota and start to use the granted quota. When the remaining quota and the granted quota have different types, and no conversion can be performed, the remaining quota and the granted quota cannot be combined.

When the granted quota and the remaining quota on the client cannot be combined, the server saves the granted quota and the remaining quota on the client, so as to separately perform a deduction from the granted quota and the remaining quota during subsequent charging. The server may determine, based on a reporting reason sent by the client or configuration information on the server, whether the granted quota and the remaining quota on the client can be combined.

The indication information used to require the client to stop using the remaining quota and start to use the granted quota may be indicated by delivering an indication parameter. For details, refer to a related example in S303 in the embodiment in FIG. 3. Details are not described herein.

The granted quota and the indication information that are sent by the server to the client may be carried in a CCA.

In an example, it is assumed that a type of the granted quota is traffic, a type of the remaining quota is duration, and no conversion can be performed between the granted traffic and the remaining duration. In this case, information carried in the CCA includes the following fields:

Multiple-Services-Credit-Control,
Granted-Service-Unit,
CC-Total-Octets,
Unit-Usage-Indicator, and
Rating-Group.

The Multiple-Services-Credit-Control is a multiple-services-credit-control field, and includes the Granted-Service-Unit field and the Rating-Group field. The Granted-Service-Unit field is information about the granted quota, the included CC-Total-Octets field is a total amount of the granted traffic, and the included Unit-Usage-Indicator field is the indication information, and is used to indicate the client to stop using the remaining duration and start to use the granted traffic.

S504. The client receives the granted quota and the indication information from the server.

After the granted quota from the server is received, an available quota on the client is the granted quota from the server.

S505. The client stops using the remaining quota, and starts to use the granted quota.

For example, when the client sends the quota request information, the remaining quota is duration of 5 minutes, and the granted quota is traffic of 10 Mbit. When receiving the indication information from the server, the client has used 2 minutes in the remaining quota of 5 minutes. In this case, the client stops using the remaining duration of 3 minutes, and starts to use the granted traffic of 10 Mbit.

S506. The client reports information of usage of the remaining quota and information of usage of the granted quota.

For specific content, refer to S406 in the embodiment in FIG. 4. Details are not described herein.

According to the technical solution provided in this embodiment of this application, when the client requests a new quota from the server, the server sends a granted quota and indication information to the client, so that the client stops using a remaining quota, and starts to use the granted quota, and then reports usage information of the remaining quota and usage information of the granted quota. Therefore, application for quota and grant of quota are more appropriate, frequent quota grant processes are effectively reduced, and a network burden is relieved. In addition, a service delay is shortened, and it is ensured that a quota used for a service does not exceed a granted quota.

In the embodiments in FIG. 3 to FIG. 5, optionally, before sending the granted quota to the client, the server may not determine whether the granted quota and the remaining quota on the client can be combined, but directly grants the quota to the client, and saves the granted quota and the remaining quota on the client. When delivering the granted quota, the server does not deliver the indication information.

After receiving the granted quota, the client may use the granted quota after using up the remaining quota, or may stop using the remaining quota, and start to use the granted quota. Alternatively, the server may indicate, by sending the indication information to the client, the client to perform the foregoing processing. For a specific process in which the server indicates, by sending the indication information to the client, the client to perform the foregoing processing, refer to S403 to S406 in the embodiment in FIG. 4 and S503 to S506 in the embodiment in FIG. 5.

In the embodiments in FIG. 3 to FIG. 5, when the client no longer needs to continue to use a quota with the rating group or the service identifier, the client clears a current remaining quota that belongs to the rating group or the service identifier. The server reclaims the current remaining quota that belongs to the rating group or the service identifier. Specifically, this may be implemented in the following two manners.

In a first manner, the client clears the current remaining quota, and sends, to the server, a charging request that carries information of quota usage but does not carry quota request information. When receiving the charging request, the server returns the current remaining quota on the client to a user account. For example, the server grants a quota of 10 Mbit whose rating group is A in a specific time, and the client no longer needs to continue to use the quota whose rating group is A after a time period. In this case, a remaining quota on the client is 7 Mbit, and the client clears the remaining quota 7 Mbit on the client. The client reports quota usage of 3 Mbit to the server by using a charging request. The charging request does not carry quota request information. The server returns the remaining quota 7 Mbit to the user account.

In a second manner, the client clears the current remaining quota, and sends, to the server, a charging request that carries a quota reclaim indicator and information of quota usage. When receiving the charging request that carries the quota reclaim indicator from the client, the server returns the current remaining quota on the client to a user account. For example, the server grants a quota of 10 Mbit whose rating group is A in a specific time, and the client no longer needs to continue to use the quota whose rating group is A after a time period. In this case, a remaining quota on the client is 7 Mbit, and the client clears the remaining quota 7 Mbit on the client. The client sends a quota reclaim indicator to the server by using a charging request. The server returns the remaining quota 7 Mbit to the user account.

In the second manner, the quota reclaim indicator may be carried in a CCR. A new indication parameter is added to serve as the quota reclaim indicator, or an unused quota may be carried in the CCR to serve as the quota reclaim indicator.

In an example, a new indication parameter is added to serve as the quota reclaim indicator. In this case, information carried in the CCR includes the following fields:

Multiple-Services-Credit-Control,
Used-Service-Unit,
Rating-Group,
Service-Identifier, and
Quota-Final-indicator.

The Quota-Final-indicator is the quota reclaim indicator.

The client may actively send, to the server, the charging request that carries the quota reclaim indicator. Alternatively, the server may first send a re-authentication request (RAR) to the client, and the client sends, to the server, the charging request that carries the quota reclaim indicator after returning a re-authentication answer (RAA). Alternatively, the server may notify, by using a CCA, the client that a quota of a rating group is to be reclaimed, so that the client sends, to the server, the charging request that carries the quota reclaim indicator. When the server determines that an event occurs, and a new quota is to be granted, an indicator is carried in the event. In an example, information carried in the CCA includes the following fields:

Multiple-Services-Credit-Control,
Granted-Service-Unit,
Rating-Group,
Service-Identifier,
Trigger,
Trigger-Type, and
Quota-Final-indicator.

When detecting that the event occurs, and reporting is to be performed, the client sends a CCR to the server, and adds the quota reclaim indicator to the CCR.

In the embodiments in FIG. 3 to FIG. 5, if the server fails to grant a quota, the server sends failure indication information of granting to the client, and indicates the client to perform the following operations: reporting information of usage of the remaining quota after using up the remaining quota, or stopping using the remaining quota, and reporting information of usage of the remaining quota when receiving the failure indication information of granting. For example, the remaining quota on the client is 5 Mbit, and when the client requests the server to grant a quota, the server fails to grant a quota. In this case, the server sends a CCA to the client, and the CCA carries the failure indication information of granting. When receiving the CCA, the client has used a quota of 2 Mbit, and a current remaining quota is 3 Mbit. In this case, the client performs the following operation: reporting information of usage of the previous remaining quota 5 Mbit after using up the current remaining quota 3 Mbit; or the client stops using the remaining quota 3 Mbit, and reports information of usage (namely, 2 Mbit) of the previous remaining quota 5 Mbit. The failure indication information of granting may be a grant failure error code, or may be an indication parameter.

In an implementation, if the server grants a relatively large quota in a specific time, when reporting information of quota usage when the reporting condition is met, the client does not request a new quota. In this case, in the embodiments in FIG. 3 to FIG. 5, the server deducts the quota usage reported by the client from a granted quota, but does not return a remaining quota to a user account. The server returns result information to the client. The client may continue to use, based on the result information, the remaining quota obtained after the deduction. For example, a quota granted by the server is 100 Mbit. When a location of the client changes, the client is triggered to report information of quota usage, and the client reports that a quota of 10 Mbit has been used. The server deducts the 10 Mbit from the granted quota 100 Mbit, reserves a remaining quota 90 Mbit to be used for the client, and does not return the remaining quota 90 Mbit to the user account. The server sends a CCA to the client to confirm that the quota of 10 Mbit has been deducted, and the client may continue to use the remaining quota 90 Mbit.

Figure 6:
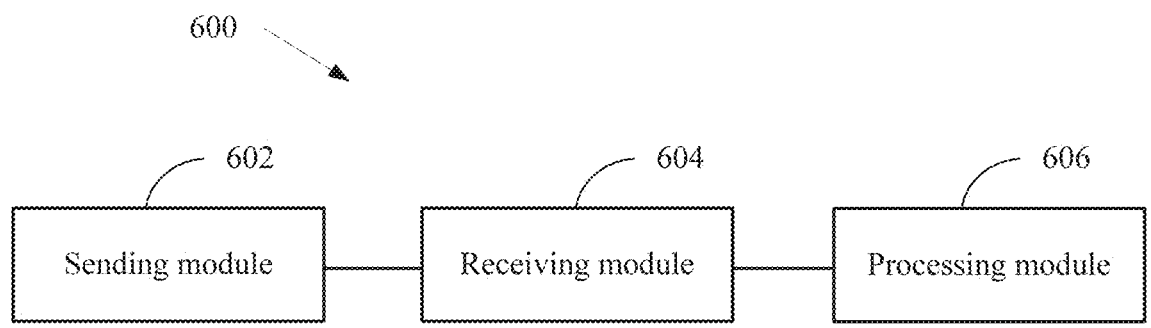
FIG. 6 is a schematic structural diagram of a client 600 according to an embodiment of this application.

FIG. 6 is a schematic structural diagram of a client 600 according to an embodiment of this application. The client 600 includes a sending module 602, a receiving module 604, and a processing module 606. The client 600 is the client 101 in FIG. 1, the computer device in the embodiment in FIG. 2, and the client in the embodiments in FIG. 3 to FIG. 5. The sending module 602 may be configured to perform S301 and S306 in the embodiment in FIG. 3, S401 and S406 in the embodiment in FIG. 4, and S501 and S506 in the embodiment in FIG. 5. The receiving module 604 may be configured to perform S304 in the embodiment in FIG. 3, S404 in the embodiment in FIG. 4, and S504 in the embodiment in FIG. 5. The processing module 606 may be configured to perform S305 in the embodiment in FIG. 3, S405 in the embodiment in FIG. 4, and S505 in the embodiment in FIG. 5.

Figure 7:
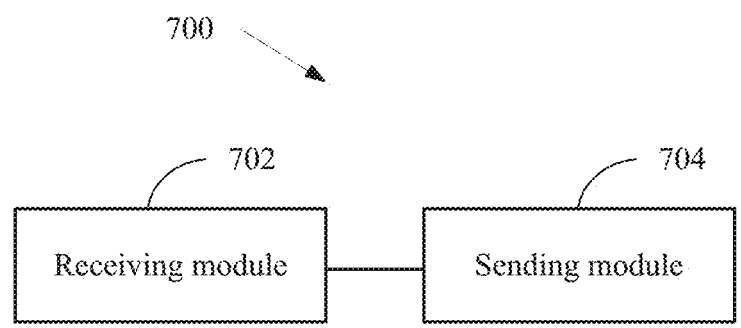
FIG. 7 is a schematic structural diagram of a server 700 according to an embodiment of this application.

FIG. 7 is a schematic structural diagram of a server 700 according to an embodiment of this application. The server 700 includes a receiving module 702 and a sending module 704. The server 700 is the server 102 in FIG. 1, the computer device in the embodiment in FIG. 2, and the server in the embodiments in FIG. 3 to FIG. 5. The receiving module 702 may be configured to perform S302 in the embodiment in FIG. 3, S402 in the embodiment in FIG. 4, and S502 in the embodiment in FIG. 5. The sending module 704 may be configured to perform S303 in the embodiment in FIG. 3, S403 in the embodiment in FIG. 4, and S503 in the embodiment in FIG. 5.

The "module" in the embodiments in FIG. 6 and FIG. 7 may be an application-specific integrated circuit (ASIC), an electronic circuit, a processor that executes one or more software or firmware programs, a memory, a combinational logic circuit, and another component that provides the foregoing functions. Optionally, the client and the server are implemented in a form of a computer device. The receiving module and the sending module may be implemented by using a processor, a memory, and a communication interface of the computer device, and the processing module may be implemented by using the processor and the memory of the computer device.

It should be noted that although only the processor 202, the memory 204, the communication interface 206, and the bus 208 of the computer device 200 are shown in FIG. 2, in a specific implementation process, a person skilled in the art should understand that the client and the server further include another device required for implementing normal running. In addition, a person skilled in the art should understand that based on a specific requirement, the client and the server may further include a hardware device that implements another additional function. Further, a person skilled in the art should understand that the client and the server may include only devices required for implementing the embodiments of this application, but do not necessarily include all the devices shown in FIG. 2.

All or some of the foregoing embodiments may be implemented by using software, hardware, firmware, or any combination thereof. When software is used for implementation, the embodiments may be implemented completely or partially in a form of a computer program product. The computer program product includes one or more computer instructions. When the computer program instructions are loaded and executed on a computer, the procedure or functions according to the embodiments of the present application are all or partially generated. The computer may be a general-purpose computer, a dedicated computer, a computer network, or another programmable apparatus. The computer instructions may be stored in a computer readable storage medium, or may be transmitted by using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any available medium that can be accessed by the computer. For example, the computer instructions may be stored or transmitted by using a magnetic medium (for example, a floppy disk, a hard disk, a magnetic tape), an optical medium (for example, DVD), or a semiconductor medium (for example, a solid state disk (SSD)).

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer readable storage medium. Based on such an understanding, the technical solutions of this application essentially, or the part contributing to the current system, or all or some of the technical solutions may be implemented in the form of a software product. The computer software product is stored in a storage medium, and includes several instructions for instructing a computer device (which may be a personal computer, a server, or a network device) or a processor (processor) to perform all or some of the steps of the methods described in the embodiments of this application. The storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
sending, by a client while using a remaining quota, a charging request to a server, wherein the charging request comprises usage information of a first quota previously granted by the server and request information for a second quota, and the remaining quota is a difference between the first quota and the usage information of the first quota;
receiving, by the client, failure indication information indicating that the server failed to grant the second quota to the client in response to the charging request;
determining, by the client whether to continue using the remaining quota; and
performing the following:
in response to determining to continue using the remaining quota, continue using the remaining quota and reporting, by the client, usage information of the remaining quota; or
in response to determining not to continue using the remaining quota, stopping using the remaining quota.

2. The method according to claim 1, wherein the failure indication information further indicates to the client to:
use the remaining quota and report usage information of the remaining quota; or
stop using the remaining quota.

3. A method, comprising:
sending, by a client while using a first remaining quota, a first charging request to a server, wherein the first charging request comprises usage information of a first quota previously granted by the server and quota request information for a new quota, and the first remaining quota is a difference between the first quota and the usage information of the first quota;
receiving, by the client, a second quota newly granted by the server and indication information from the server in response to the first charging request;
using a third quota, by the client according to the indication information, wherein the third quota comprises the first remaining quota and the second quota, or the third quota comprises the second quota only; and
reporting, by the client when a reporting condition is met, usage information of the first remaining quota and usage information of the second quota.

4. The method according to claim 3, wherein using the third quota, by the client according to the indication information, comprises:
combining, by the client, the second quota and the first remaining quota into a combined quota.

5. The method according to claim 3, wherein using the third quota, by the client according to the indication information, comprises:
using, by the client according to the indication information, the second quota after using up the first remaining quota.

6. The method according to claim 3, wherein using the third quota, by the client according to the indication information, comprises:
in response to receiving the indication information, stopping using, by the client, the first remaining quota and starting, by the client, using the second quota.

7. The method according to claim 3, wherein reporting, by the client when the reporting condition is met, the usage information of the first remaining quota and the usage information of the second quota comprises:
sending, by the client to the server, a second charging request comprising usage information of the third quota but not comprising request information for a fourth quota; and
wherein the method further comprises:
clearing, by the client, a second remaining quota; and
suspending, by the client, a service data flow, wherein the second remaining quota is a difference between the second quota and the usage information of the third quota comprised in the second charging request.

8. A device, comprising a processor and a memory, wherein the memory is configured to store executable instructions, and when the device runs, the processor executes the executable instructions to:
send a charging request to a server while using a remaining quota, wherein the charging request comprises usage information of a first quota previously granted by the server and request information for a second quota, and the remaining quota is a difference between the first quota and the usage information of the first quota;
receive failure indication information indicating that the server failed to grant the second quota to the device in response to the charging request;
determine whether to continue using the remaining quota; and
perform the following:
in response to determining to continue using the remaining quota, continue using the remaining quota and report usage information of remaining quota; or
in response to determining not to continue using the remaining quota, stop using the remaining quota.

9. The device according to claim 8, wherein the failure indication information further indicates to the device to:
　use the remaining quota and report usage information of the remaining quota; or
　stop using the remaining quota.

10. A device, comprising a processor and a memory, wherein the memory is configured to store executable instructions, and when the device runs, the processor executes the executable instructions to:
　send, while using a first remaining quota, a first charging request to a server, wherein the first charging request comprises usage information of a first quota previously granted by the server and quota request information for a new quota, and the first remaining quota is a difference between the first quota and the usage information of the first quota;
　receive a second quota newly granted by the server and indication information from the server in response to the first charging request;
　use a third quota according to the indication information, wherein the third quota the third quota comprises the first remaining quota and the second quota, or the third quota comprises the second quota only; and
　report, when a reporting condition is met, usage information of the first remaining quota and usage information of the second quota.

11. The device according to claim 10, wherein using the third quota according to the indication information comprises:
　combining the second quota and the first remaining quota into a combined quota.

12. The device according to claim 10, wherein using the third quota according to the indication information comprises:
　using, according to the indication information, the second quota after using up the first remaining quota.

13. The device according to claim 10, wherein using the third quota according to the indication information comprises:
　in response to receiving the indication information, stopping using the first remaining quota and starting using the second quota.

14. The device according to claim 10, wherein reporting, when the reporting condition is met, the usage information of the first remaining quota and the usage information of the second quota comprises:
　sending, to the server, a second charging request comprising usage information of the third quota but not comprising request information for a fourth quota; and
　wherein when the device runs, the processor further executes the executable instructions to:
　　clear a second remaining quota; and
　　suspend a service data flow, wherein the second remaining quota is a difference between the second quota and the usage information of the third quota comprised in the second charging request.

15. A method, comprising:
　receiving, by a server, a first charging request from a client, wherein the first charging request comprises usage information of a first quota previously granted by the server and quota request information for a new quota; and
　sending, by the server to the client in response to the first charging request, a second quota that is newly granted by the server and indication information, wherein the indication information indicates to the client to use a third quota, the third quota comprises a first remaining quota and the second quota, or the third quota comprises the second quota only, and the first remaining quota is a difference between the first quota and the usage information of the first quota.

16. The method according to claim 15, wherein the indication information indicating the client to use the third quota comprises the indication information indicating to the client to:
　combine the second quota and the first remaining quota, to form a combined quota.

17. The method according to claim 15, wherein the indication information indicating the client to use the third quota comprises the indication information indicating to the client to:
　use the second quota after using up the first remaining quota.

18. The method according to claim 15, wherein the indication information indicating the client to use the third quota comprises the indication information indicating to the client to:
　stop using the first remaining quota and start to use the second quota when receiving the indication information.

19. The method according to claim 15, further comprising:
　when the server receives a second charging request that comprises usage information of the third quota but does not comprise request information for a fourth quota, returning, by the server, a second remaining quota to a user account, wherein the second remaining quota is a difference between the second quota and the usage information of the third quota.

20. The method according to claim 15, further comprising:
　when the server fails to grant a new quota, sending, by the server, failure indication information to the client, wherein the failure indication information indicates to the client to report usage information of the first remaining quota after using up the first remaining quota.

21. The method according to claim 15, further comprising:
　when the server fails to grant a new quota, sending, by the server, failure indication information to the client, wherein the failure indication information indicates to the client to stop using the first remaining quota and to report usage information of the first remaining quota when receiving the failure indication information.

* * * * *